Oct. 7, 1958 G. A. KNAPP 2,855,498
VEHICLE CLEARANCE LIGHT
Filed Aug. 3, 1954
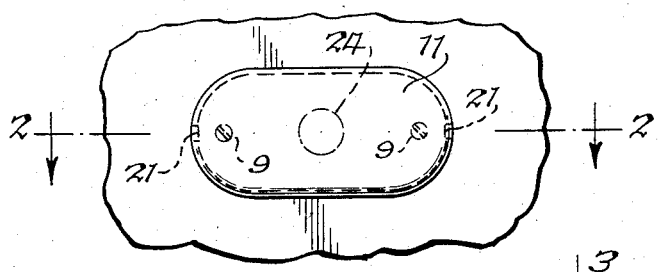
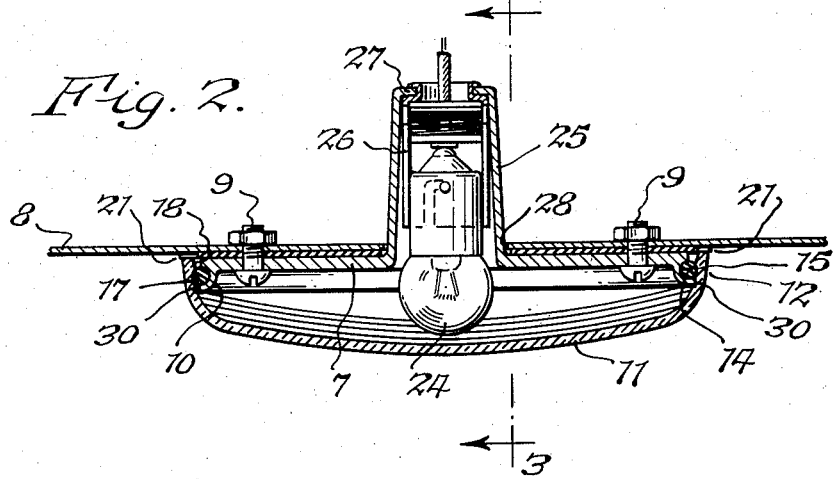
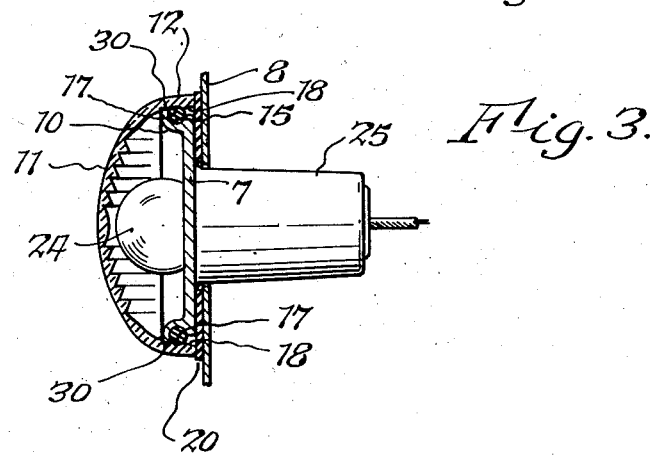
INVENTOR.
George A. Knapp
BY
Attorneys.

United States Patent Office 2,855,498
Patented Oct. 7, 1958

2,855,498

VEHICLE CLEARANCE LIGHT

George A. Knapp, De Witt, N. Y., assignor to R. E. Dietz Company, Syracuse, N. Y.

Application August 3, 1954, Serial No. 447,584

2 Claims. (Cl. 240—7.1)

This invention relates to electric lights of the type commonly used on the sides of trucks, trailers, buses or other vehicles to serve as guides at night time to indicate the sides of the vehicle.

Lights of this type are commonly placed on vehicles to guide the drivers themselves while maneuvering the vehicles into positions at loading platforms or the like, and the lights also serve to aid passing vehicles to avoid collision or scraping of the sides of a vehicle. Such lights, however, may equally well be used on other parts of motor vehicles for other purposes.

One of the objects of this invention is to provide a light of this kind which is so constructed as to project to the minimum extent from the side of a truck, trailer or other vehicle.

Another object is to provide a light of this kind having the lens mounted thereon so as to provide for the maximum illumination, particularly when seen edgewise.

It is also an object to provide a light of this kind with a gasket for forming a water-tight seal between the lens and the base of the light and to employ this seal as a means for removably holding the lens in place on the base of the light.

A further object is to provide a light of this kind with a lens which may be readily removed from and replaced on the body portion of the light so that if the lens becomes damaged or broken by contact with a vehicle or other body, a new lens may be readily substituted; also to provide a light in which the lens is so mounted as to resist removal from the light by lateral pressure applied to the lens.

Other objects and advantages will be apparent from the following description of one embodiment of the invention and the novel features will be particularly pointed out hereinafter in connection with the appended claims.

In the accompanying drawings:

Fig. 1 is a face view of a motor vehicle light embodying this invention.

Fig. 2 is a sectional view thereof, on an enlarged scale, on line 2—2, Fig. 1.

Fig. 3 is a transverse sectional view thereof, on line 3—3, Fig. 2.

In the particular embodiment of this invention illustrated by way of example in the accompanying drawings, the light includes a base 7 which is relatively flat and adapted to be secured to a part 8 of a vehicle in any suitable manner, for example, by means of screws or bolts 9 extending through holes in the base 7 and into the part 8 of the vehicle. Any other means for securing the base to the vehicle may, however, be employed.

The base may be of any suitable shape, that shown being provided with flat upper and lower edges and rounded ends and with a flange 10 extending outwardly from the periphery of the base, the flange being preferably formed integral with the base. 11 represents the lens which may be of any suitable or desired construction, that shown being similar in outline to the base but somewhat larger than the base so that the edge portion 12 of the lens will extend about the exterior of the flange 10.

The lens 11 is preferably removably secured to the flange 10 of the base by means of an elastic ring or gasket 14 of the type commonly referred to as an O-ring. This ring may be made of rubber or other elastic material and is stretched to fit about the exterior of the flange 10, and in order to hold the ring or gasket on the flange, the flange is preferably provided on the exterior surface thereof with a groove 15 into which the ring extends. The inner surface of the edge portion 12 of the lens is provided with a shallow groove 17, also formed so that the ring 14 will readily fit into the same. This groove 17 terminates at the open face of the lens in a slightly inclined, rounded, or bevelled surface 18 which is so formed that when the ring 14 is in place on the flange 10 of the base, the lens can be placed into its operative position, as shown in Figs. 1 to 3, by merely pressing the lens toward the base 7, whereupon the elastic ring 14 will be initially deformed or compressed by the inclined surface 18, but upon further movement of the lens toward the base, the ring or gasket 14 will seat in the groove 17 of the lens, thus yieldingly holding the lens in place on the flange of the base 7. 20 represents a mounting gasket or sealing member which is interposed between the base 7 and the side wall of the vehicle and which also acts as a cushion to prevent rattling.

It is also desirable to provide means whereby the lens may be readily removed from the base of the light, and for this purpose, the mounting gasket or sealing member 20 is preferably cut away at the ends thereof as shown at 21 to provide one or more rectangular recesses which form spaces between the lens and the part 8 of the vehicle into which a knife, screwdriver or other implement may be inserted to pry the lens away from the base 7, during which removal of the lens the resilient ring 14 will again be deformed sufficiently to move out of the groove 17 in the lens. After a slight movement of one end of the lens from the base, the lens can be readily removed completely from the base. During the removal of the lens from the base, the O-ring will remain on the flange of the base because the groove in the flange is considerably deeper than the groove in the lens, and also because the O-ring is held by its own resilience to the flange.

The construction thus far described has the advantages that the O-ring or gasket 14 serves the two-fold purpose of forming a water-tight seal between the lens and the base of the light, and also of serving as a means for readily positioning the lens on the base and removing the same therefrom. The construction shown has a further advantage over constructions in which the flange of the base extends around the exterior of the lens. By means of the construction shown, the entire lens will be illuminated, particularly if the same is made of Lucite or similar material, so that it can readily be seen in the dark, including those parts of the edge portions thereof which are arranged on the exterior of the flange 10. Light is transmitted along the lens to the extreme edge portions thereof, and consequently, when these edge portions are on the exterior of the flange 10, they will be visible. When a vehicle is maneuvered into close proximity to another vehicle or a fixed object, it is quite important to show exactly how far the sides of the vehicle extend outwardly and by providing a construction in which the edge portion of the lens is on the exterior of the flange of the base, the exact location of the side of the vehicle is shown by the illuminated edge portions of the lenses.

The usual lamp bulb 24 may be arranged within the light in any suitable or desired manner. In the construction shown by way of example for this purpose, the base is preferably a die-casting having an integral rearwardly extending approximately cylindrical part 25 within which a lamp bulb socket 26 is arranged. The part 25 is provided with an inwardly extending flange 27 on the end thereof about which the outer end of the socket is pressed or otherwise formed to securely hold the same in the part 25. The cylindrical extension 25 is formed to extend through an opening 28 formed in the part 8 of the vehicle. Any other suitable or desired means for mounting the lamp bulb in the light may be employed, if desired. By providing the part 25 on the back of the base 7 and arranging the same in a hole or opening in the side of the vehicle, the entire light extends to a very limited extent beyond the side of the vehicle. By making the base and the socket supporting part or extension in one piece, a sturdy and water-tight construction results which protects the lamp socket against damage.

Means are also provided for resisting to the maximum extent the inadvertent or accidental removal of the lens from the base other than by the means described which include the use of a screwdriver or other edge, by inserting the same into the cutaway edge portion or recess 21 of the sealing gasket 20. It is particularly desirable, for example, to provide means for preventing removal of the lens by jarring or brushing off by merely shifting the same approximately in the plane of the side 8 of the body portion of the vehicle, as might readily happen if the lens contacts with an object while the vehicle is in motion. For this purpose, I have provided the flange 10 of the base with an outwardly extending part or shoulder 30 which approaches very closely to the inner surface of the edge portion of the lens. Consequently, any lateral or up or down pressure applied to the lens will be resisted by this shoulder 30 of the flange, and thus prevent such pressure on the lens from collapsing one side of the O-ring 14 to a sufficient extent to entirely disengage the opposite side or end of the lens from the adjacent part of the O-ring, and thus permit the lens to move outwardly from the side 8 of the vehicle, and consequently, drop out of its operative position. The clearance between the projection 30 and the inner surface of the lens can be very small, for example, .003 inch, and this, of course, will not interfere with the removal of the lens by the means described, in which the lens is moved in a direction away from the side of the vehicle. The shoulder 30 thus stops the movement of the lens before the same has compressed the O-ring sufficiently to allow the lens at the side opposite to that at which the force is applied to become disengaged from the O-ring.

It will be understood that various changes in the details, materials and arrangements of parts which have been herein described and illustrated in order to explain the nature of the invention, may be made by those skilled in the art within the principle and scope of the invention, as expressed in the appended claims.

I claim as my invention:

1. In a clearance light for a vehicle, a base having a shallow outwardly projecting peripheral flange provided with a groove on the outer surface thereof, a lens overlying said base and having an edge portion extending about the exterior of said flange with a clearance space therebetween, said lens edge portion having a groove in the inner surface thereof, an elastic sealing ring occupying said clearance space and being engaged on opposite sides by said flange and lens grooves to secure the lens to the base and form a seal therebetween, the groove in said lens being of less depth than the groove in said flange, and a shoulder on said flange extending outwardly over said sealing ring and terminating in close proximity to the inner surface of the edge portion of said lens to limit lateral movement of the lens to an amount insufficient to measurably compress the sealing ring at any point along its periphery.

2. In a clearance light for a vehicle, a unitary base member adapted to be secured to a portion of the vehicle, said base member including a shallow outwardly projecting peripheral flange provided with a groove on the outer surface thereof, a lens overlying said base member and having an edge portion extending about the exterior of said flange with a clearance space therebetween, said lens edge portion having a groove in the inner surface thereof confronting said flange groove, and an elastic sealing ring occupying said clearance space and being engaged on opposite sides by said flange and lens grooves to secure the lens to the base and form a seal therebetween, the groove in said lens being of less depth than the groove in said flange, said flange having a shoulder at its outer edge extending outwardly therefrom in a plane substantially parallel to the plane of said base member and terminating in close proximity to the inner surface of the edge portion of said lens to prevent the lens from being moved laterally sufficiently far to compress the sealing ring at one side of the light and thereby increase the clearance between the lens and flange on the opposite side thereof so that the lens becomes disengaged from the ring at that point, said shoulder thereby preventing removal of said lens from said base member except by movement of the lens in a direction substantially perpendicular to the base member.

References Cited in the file of this patent

UNITED STATES PATENTS

| 28,413 | Sellers | May 22, 1860 |
| 2,091,489 | Prance | Aug. 31, 1937 |
| 2,106,144 | Floraday | Jan. 18, 1938 |
| 2,688,688 | Holtz | Sept. 7, 1954 |
| 2,707,747 | De Frees | May 3, 1955 |
| 2,730,611 | Black | Jan. 11, 1956 |

FOREIGN PATENTS

| 21,443 | Great Britain | 1895 |
| 647,374 | Great Britain | Dec. 13, 1950 |